Apr. 24, 1923.

C. F. SNYDER 1,453,197

FACING OR CUTTING TOOL

Filed Sept. 2, 1921

INVENTOR.
Charles F Snyder
by W. G. Doolittle
Attorney.

Patented Apr. 24, 1923.

1,453,197

UNITED STATES PATENT OFFICE.

CHARLES F. SNYDER, OF PITTSBURGH, PENNSYLVANIA.

FACING OR CUTTING TOOL.

Application filed September 2, 1921. Serial No. 497,813.

*To all whom it may concern:*

Be it known that I, CHARLES F. SNYDER, a citizen of the United States, residing at Pittsburgh, in the county of Allegheny and State of Pennsylvania, have invented certain new and useful Improvements in Facing or Cutting Tools, of which the following is a specification.

My invention relates to a facing tool for surfacing a joint structure to provide thereon a surface of the kind shown in my Patent No. 1,348,667, dated August 3, 1920, and is for an improvement over the tool shown in my co-pending application Serial No. 383,687, filed May 24, 1920.

The objects of the invention are to provide a tool which can rapidly cut the desired surface on the metal, and which will dig out or cut out a minimum amount of material, and which can be cheaply made and easily sharpened after use.

In the accompanying drawings, which illustrate my invention:

Figure 1:
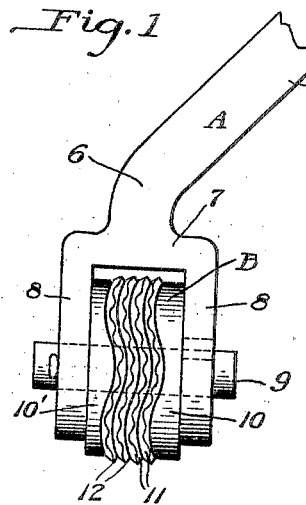
Fig. 1 is a front elevational view of a tool embodying my invention.
Figure 2:
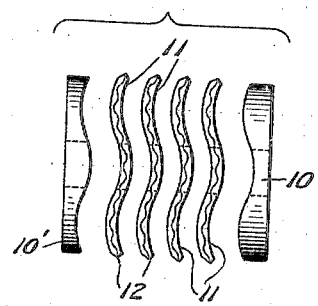
Fig. 2 is an elevational view showing the various parts of the cutter structure before being assembled.

Referring to the drawings, and first to the form of cutter shown in Fig. 1, A designates the tool holder, and B the cutter.

The tool holder A comprises a shank 5 of a suitable shape. As shown in the drawings, it is of such a shape as to be mounted in the usual tool post of a lathe or similar machine. One end of the shank is bent at 6 and is provided with a bifurcated portion 7 providing spaced apart extensions 8. Passing through openings in the extensions 8 is a removable pin or shaft 9 on which the cutter B is rotatably carried.

The cutting or facing element B is similar in its general construction to the one shown in my co-pending application hereinbefore mentioned. It is formed of end clamping plates 10 and 10' having their inner faces formed in such manner as to be undulating or waved. Clamped between the plates 10 and 10', and held in position by means of rivets 10$^a$ or other suitable means extending therethrough, is a series of cutting disks 11.

Each of the cutting disks 11 is preferably formed from sheet metal, and then so pressed in such manner as to provide a sinuous or wave-like periphery thereon. The sinuations on the periphery are gradual, so that it is a relatively long distance between the crest and the base of any one wave.

Preferably after the disk has been bent, the cutting edge 12 is formed thereon. This is done by first holding one side of the edge of the disk against an abrasive wheel and grinding an annular series of small spaced apart hollows therein. The disk is then turned over, and a similar annular series of hollows is formed on the other side of the peripheral portion, but in staggered relation to the hollows of the series first formed. The hollows are designated by $h$ in the drawings. Grinding the disk in this manner forms a sharp beveled cutting edge 12 which is wave-like, or sinuous, the waves being relatively small. The smaller sinuations are formed independently of the large ones that are made when the disk is bent.

Figure 5:
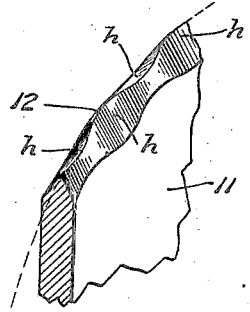
Fig. 5 is an enlarged perspective view of a portion of the cutting edge of the disk.

In Fig. 5, which shows a very small portion of the periphery of one of the disks on a very much enlarged scale, the broken line X—X indicates the general sinuous path of the edge 12, while this figure shows how the smaller wave-like portions are formed on the long ones.

Figure 3:
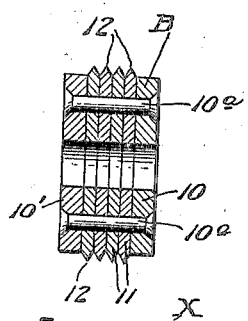
Fig. 3 is a section through the cutter after being assembled.
Figure 4:
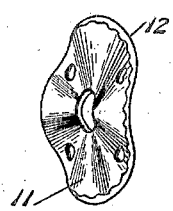
Fig. 4 is a perspective view of one of the cutter disks.

It will be understood that the waved surfaces of the end members 10 and 10', the diameters of which are less than that of the disks 11, conform substantially to the shape to which the disks are bent. In assembling the cutter, the disks are all preferably consecutively numbered and fitted together between the clamping plates 10 and 10'. The clamping plates and disks, when thus assembled, are heated and pressed so as to insure of the close fitting of the disks and the clamping members. They may then be riveted, as shown in Fig. 3.

When thus assembled, the cutter B has a series of continuous annular, beveled, sinusoidal cutting edges, each of which sinusoidal cutting edges has smaller wavelike or sinuous cutting portions thereon. It may be mounted in the tool holder A and held against the work, while the work, such as a pipe flange, is revolved, or it may be revolved against a stationary piece of work. In traveling over the work, the cutters dig into the metal, and chop it up without removing any appreciable amount of the metal, and form a granulated surface, as disclosed in my patent hereinbefore referred to. The large and small sinuations cooperate to prevent the individual disks from merely keeping in the same track as the work revolves.

The cutter can be sharpened from time to time by removing the rivets and re-grinding the disks. When assembled, after sharpening, they should be assembled in accordance with their numbering, so that they will have the same relative position in the cutter as they had when first assembled to insure accurate fitting.

Figure 6:
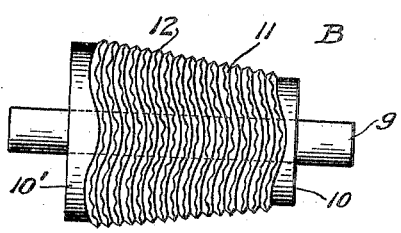
Fig. 6 is an elevational view of a modified form of cutter for working at high speeds on a relatively wide annular surface.

In the construction shown in Fig. 6, the construction is similar to that hereinbefore described, but the disks 11 are of graduated sizes so that the cutter is conical. This arrangement is desirable where it is desired to have a relatively wide cutter to engage an annular member, such as a pipe flange, when operating at high speeds.

I claim as my invention:

1. A cutter disk for forming a granulated surface on metallic articles, having a sinusoidal periphery provided with a continuous annular sharp beveled cutting edge of a nature adapted to cut into a metal surface and give it a pitted or granulated appearance.

2. A cutter disk for forming a granulated surface on metal articles having a sinusoidal periphery and a continuous annular beveled edge thereon, each sinuation of the beveled edge having a series of smaller sinuations formed thereon.

3. A cutter disk for forming a granulated surface on metal articles formed from sheet metal and having spaced apart hollowed portions at the sides of the periphery which form a sinuous cutting edge.

4. A cutter disk for forming a granulated surface on metal articles having its periphery beveled to form a cutting edge thereon, said cutting edge having spaced apart hollows formed therein on each side thereof, the hollows on opposite sides being staggered with relation to each other to form small sinuations therein.

5. A cutter disk for forming a granulated surface on metal articles, which disk is formed of metal and has a cutting edge formed thereon having a series of small spaced apart hollows ground on each side thereof in such manner as to form small sinuations therein, said disk also being bent to make the periphery thereof sinuous.

6. A cutter for forming a granulated surface on metal articles comprising a rotatable member having its periphery provided with a series of sinuous beveled annular cutting edges, the sinuations of which are relatively long and gradual, said cutting edges also having a series of small sinuations formed therein which are independent of the long gradual sinuations.

7. A cutter for forming a granulated surface on metal articles comprising a series of bent metal disks secured together and having continuous sinusoidal peripheries, said peripheries having spaced apart hollows formed therein on opposite sides thereof which form a wave-like cutting edge.

In testimony whereof I affix my signature.

CHARLES F. SNYDER.